(12) United States Patent
Lorenzana et al.

(10) Patent No.: US 6,609,476 B1
(45) Date of Patent: Aug. 26, 2003

(54) ANTENNA MOUNTED FLAG

(76) Inventors: Vance A. Lorenzana, 73 Chippewa Dr., Oswego, IL (US) 60543; Moises B. Lorenzana, 13411 Lakeshore Dr., Plainfield, IL (US) 60544

( * ) Notice: Subject to any disclaimer, the term of this patent is extended or adjusted under 35 U.S.C. 154(b) by 49 days.

(21) Appl. No.: 10/061,595

(22) Filed: Feb. 1, 2002

(51) Int. Cl.[7] .............................. B60Q 1/26; G09F 17/00
(52) U.S. Cl. ....................... 116/173; 116/28 R; 40/591; 40/607; 403/389
(58) Field of Search .................................. 116/173, 174, 116/28 R; 40/591, 218, 607; 403/389, 223

(56) References Cited

U.S. PATENT DOCUMENTS

| | | | | |
|---|---|---|---|---|
| 2,168,484 A | * | 8/1939 | Loux | 116/173 |
| 2,856,891 A | * | 10/1958 | Solomon | 116/173 |
| 2,905,140 A | | 9/1959 | Acklam | |
| 3,075,492 A | * | 1/1963 | Winfrey | 116/28 R |
| 3,500,789 A | * | 3/1970 | Keats | 116/173 |
| 4,110,818 A | * | 8/1978 | Hempsey | 362/493 |
| 5,363,792 A | | 11/1994 | Petechik | |
| 5,590,621 A | | 1/1997 | Sectish | |
| 5,740,622 A | | 4/1998 | Martin | |
| 6,334,284 B1 | * | 1/2002 | Provitola | 52/698 |

* cited by examiner

Primary Examiner—Diego Gutierrez
Assistant Examiner—Tania C. Courson
(74) Attorney, Agent, or Firm—Neil M. Rose

(57) ABSTRACT

A flag for mounting on a vehicle radio antenna having a flat body which is uniformly tapered from a leading edge formed with a mounting rib towards a trailing edge which is thinner than the leading edge, the mounting rib having projections at either end which are encircled by resilient rings biasing the projections and the mounting rib against the antenna.

14 Claims, 1 Drawing Sheet

U.S. Patent     Aug. 26, 2003     US 6,609,476 B1
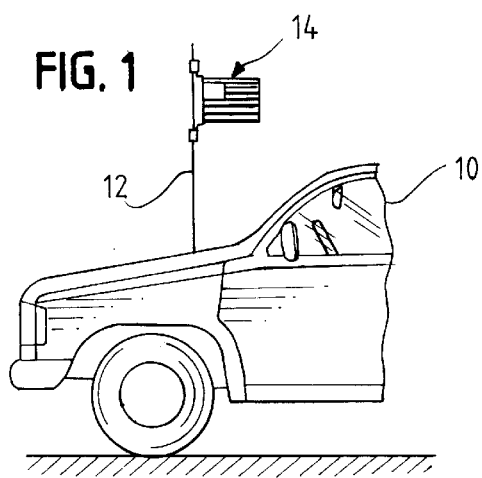
FIG. 1
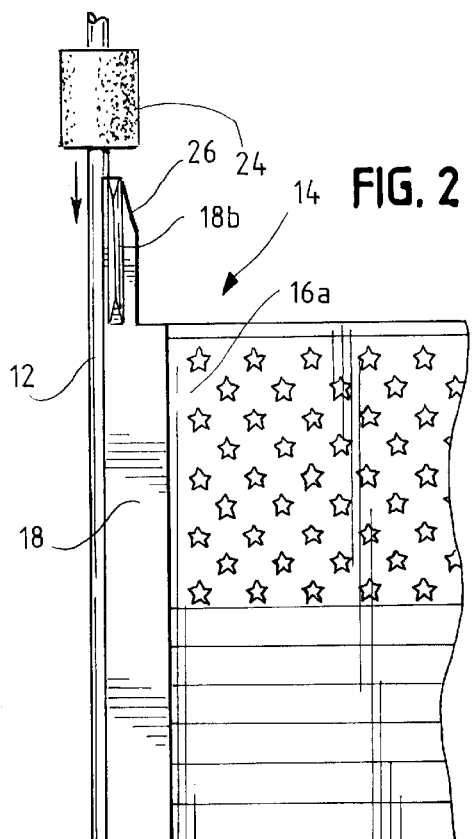
FIG. 2
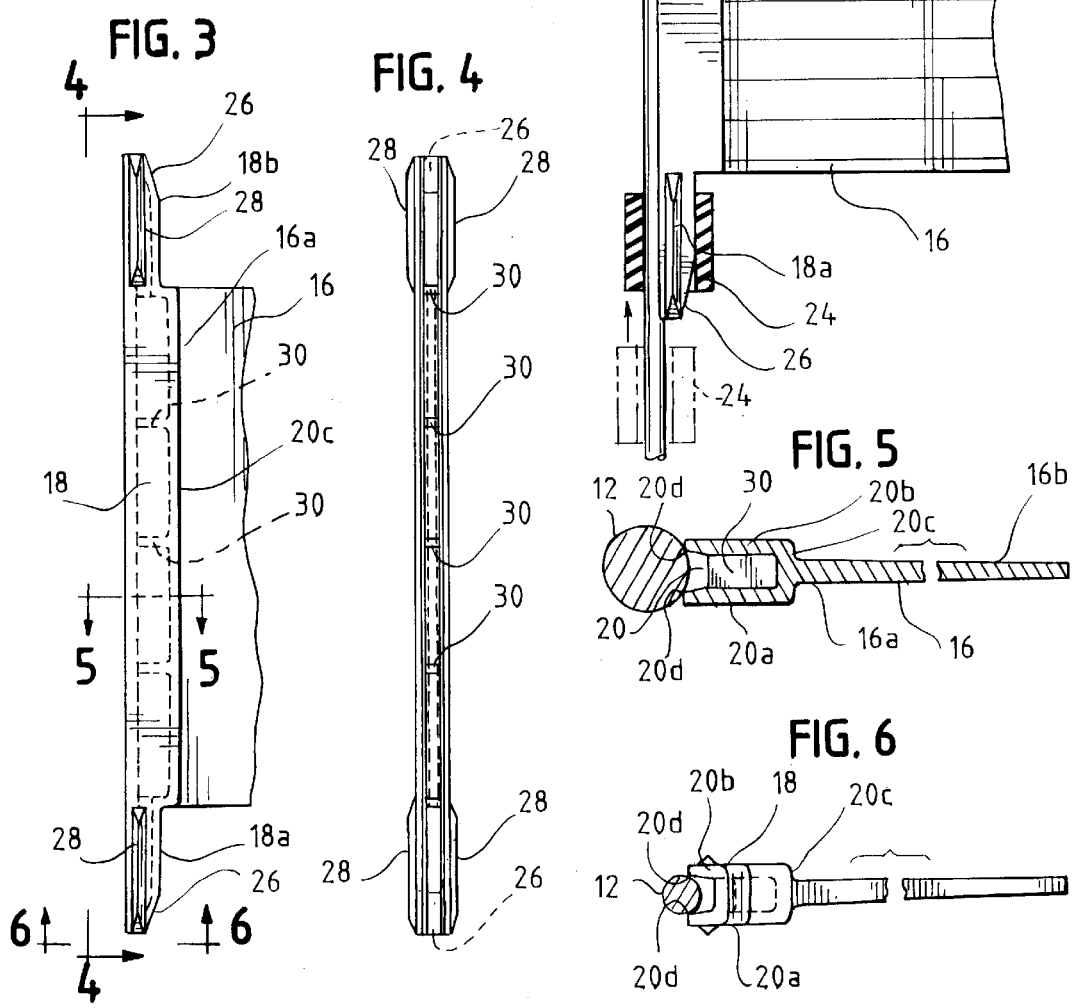
FIG. 3
FIG. 4
FIG. 5
FIG. 6

ANTENNA MOUNTED FLAG

BACKGROUND OF THE INVENTION

The invention relates generally to flags and pennants that are mounted temporarily or permanently to the radio antenna of an automobile or truck. These flags or pennants have typically been composed of either a flexible fabric material such as cloth or light plastic or of a substantially rigid material usually a plastic material. The location on the automobile radio antenna for the mounting of a flag or pennant is preferred because this location provides a prominent, elevated position which is readily visible by the public as the automobile or truck passes by on the street. The mounting of such flags or pennants on vehicle antennas is limited to fixed, vertical antennas and is not suitable for the retractable antennas or the angled non-vertical antennas.

The purpose of such flags or pennants may be merely decorative or for advertising some company, product or coming event. They are also used to designate cars as being part of a funeral procession or some other type of parade or procession. Whatever the purpose or type of use of an antenna mounted flag or pennant, it may be necessary or important to have a mounting which provides for easy installation and removal of the flag on the antenna. As a consequence of the damage likely to be caused to such flags or pennants in a commercial car wash, for instance, they should be readily removable to avoid such damage.

It should be understood that fabric or flexible antenna flags or pennants tend to flap or whip violently when the vehicle on which they are mounted is driven at elevated speeds. Thus, a flag made of inexpensive cotton material may disintegrate rapidly on a car traveling at 65 miles an hour. It has also been noted that the violent wind action even at lower speeds tends to whip the flag around so much that it is difficult to discern whatever is imprinted on the flag or pennant. In contrast, the rigid type of flag or pennant remains relatively fixed at any speed and is not subject to the problems of visibility and wear described above in connection with the flexible, fabric flags or pennants. However, it is important that even a rigid type of flag be secured to the antenna tightly enough so that it has no tendency to rotate as the wind swirls around the antenna. If the flag or pennant remains fixed in the direction of the vehicle travel, the image or message will be in the optimum position to be seen as the vehicle passes.

The radio antennas for automobile radios differ considerably in size and construction some being collapsible multi-section units and some being one piece constant cross section units. The metal rod or tubing used in fabricating the antenna is typically anywhere between ⅛ inch and ¼ inch in diameter. It would be desirable to provide a flag or pennant having a mounting which would be adapted for fastening to any automobile antenna having a rod or tubing diameter falling within the range noted above. The flag or pennant mounting means shown in the prior art are not adapted to mounting on antennas having various different diameter tubing.

The prior art patents to Solomon U.S. Pat. No. 2,856,891 and Martin U.S. Pat. No. 5,740,622 are noted of interest with respect to the present invention in showing rigid type antenna mounted flags or pennants. Both of these patents involve mounting means which are more complicated and less effective in fixedly mounting the flag or pennant than the structure of the present invention.

BRIEF SUMMARY OF THE INVENTION

The present invention is directed to a rigid flag for mounting on the radio antenna of an automobile or truck. It is preferably fabricated of molded plastic having a thin flat rectangular body with a thickened mounting rib extending along one edge thereof. In order to achieve the desired rigidity of the flag and at the same time minimize the weight and bulk of plastic in the flag, it has been found that improved performance is achieved by tapering the thickness of the flag from the mounting edge or leading edge toward the trailing edge, the edge remote from the mounting edge. With the flag having a thickness two or three times as great at the leading edge as compared to the trailing edge, the amount of plastic used in the flag may be minimized while still achieving the objective of a flag which wears well and has no tendency to flap in the wind at high vehicle speeds. This tapering of the flag body reduces the air turbulence and the resulting movement as compared to flags having a body of constant thickness.

The flat rectangular body of the flag is imprinted or molded with the illustration of an American flag, for instance, or any other desired symbol, slogan, advertising material or public announcement. The mounting rib is coextensive with one of the short edges of the rectangular body and has mounting extensions or projections extending beyond the rectangular body. The mounting rib is formed with a channel which extends from end to end of the mounting rib and which has opposed, spaced walls. The mounting rib is designed to engage the tubing of an automobile antenna and restrain the flag from rotating with respect to the antenna. The spaced walls of the channel are spaced apart a distance slightly less than the diameter if the smallest antenna rod or tubing in use today which is ⅛ inch. The outer edges of the opposing channel walls are formed with sharp edges which engage the cylindrical surface of the antenna in its mounted position. The antenna mounting means includes resilient biasing means to urge the mounting rib channel against the antenna so that the channel wall edges engage the antenna to restrain the flag or pennant from rotating with respect to the antenna tubing. When the flag mounting means is applied to the largest antenna tubing in common use which is ¼ inch in diameter, the same sharp edges of the channel walls engage the tubing to restrain rotational movement of the flag or pennant.

In order to provide the biasing force to urge the mounting rib against the antenna to retain it in position, there is provided a pair of resilient tubular sections or rings which are first applied to the antenna After the flag is placed in the desired position with the mounting rib against the antenna and with the rings above and below the flag, the rings are forced over the mounting extensions. The mounting extensions are formed with laterally positioned bars that engage the resilient retaining rings and restrain their displacement from the assembled positions. The resilient rings have an elasticity so that they may apply sufficient tension between the antenna tubing or rod and the mounting extensions to attach the flag or pennant firmly to the antenna so that it will neither slide lengthwise of the antenna nor rotate with respect to the antenna. The elasticity of the rings is sufficient so that adequate tension is provided to secure the flag or pennant to either a ⅛ inch or ¼ inch diameter rod or tube. While the rings shown in the disclosed embodiment comprise sections of tubing having a length almost twice the diameter of the tubing, it is contemplated that an o-ring could also be used. The sections of tubing are preferred as they provide better frictional engagement with the mounting extensions than would an o-ring.

BRIEF DESCRIPTION OF THE SEVERAL VIEWS OF THE DRAWING

An embodiment of the invention is illustrated in the accompanying drawing in which:

FIG. 1 is a view of the flag or pennant applied to the antenna of an automobile radio;

FIG. 2 is an enlarged elevational showing a section of the radio antenna with the mounting portion of the flag with the two resilient tubular sections for securing the flag to the antenna being shown one separated from the flag mounting projections and one in section surrounding one of the mounting projections;

FIG. 3 is a fragmentary side elevational view of the mounting portion of the flag;

FIG. 4 is a view of the mounting portion of the flag taken on line 4—4 of FIG. 3;

FIG. 5 is a section taken on line 5—5 of FIG. 3 including a sectional view of the antenna; and FIG. 6 is a view of the mounting portion of the flag taken on line 6—6 of FIG. 3 and including a small diameter antenna engaged with the mounting portion.

DETAILED DESCRIPTION OF THE INVENTION

Shown in FIG. 1 is an illustration of an automobile 10 having a radio antenna 12 to which is secured a flag 14 embodying the present invention. The flag 14 includes a thin rectangular body 16 which may be imprinted with an American flag or any other slogan, advertisement, message, or device suitable for prominent display by the automobile 10, It is also contemplated that the body 16 of the flag 14 may have a triangular or other shape rather than rectangular.

In a constructed embodiment of the invention, the flag 14 was molded of high impact styrene with the thickness of the body 16 tapering from 0.076 inches at an edge 16a adjacent the antenna to 0.036 inches at an edge 16b disposed most remote from the antenna 12. Along the thicker edge 16a of the body 16 the flag 14 is formed with a mounting rib 18 as best shown in FIG. 2. The rib 18 is molded integrally with the body 14 and includes mounting projections 18a and 18b extending above and below the body 16 as shown best in FIGS. 2 and 3.

The thicker edge 16a of the flag body 16 is at the edge closest to the mounting rib 18 and to the antenna and may be termed the leading edge of the flag while the thinner edge 16b may be termed the trailing edge. The action of the air across the flag 14 while the vehicle is in motion has a tendency to cause the flag to flap about its mounting on the antenna. Even though the high impact styrene is reasonably rigid, the flag may still have a tendency to flap if the thickness is not adequate. In order to reduce the overall weight of plastic material used in the flag 14 and still maintain sufficient rigidity to avoid flapping of the flag, it was found desirable to taper the flag as described above so that the leading edge is from two to three times as thick as the trailing edge. The tapered shape also tends to minimize turbulence and promote laminar air flow across the flag. Accordingly, the shape of the flag provides added stability against flapping or rotational movement around the antenna mounting.

The mounting rib 18 is formed with a lengthwise extending channel 20 which is defined in part by the spaced walls 20a and 20b which are connected together by the wall 20c. The channel 20 is open in the side opposite the wall 20c and has the walls 20a and 20b formed at their opposite edges with sharp corners 20d which are adapted to engage the outer diameter of the antenna as best shown in FIGS. 5 and 6. For the purpose of illustrating the manner in which the mounting rib engages antennas having different outside diameters, FIG. 5 shows the edges 20d engaged with the ¼ inch diameter antenna and FIG. 6 shows the engagement with the ⅛ inch diameter. In each instance, the edges 20d serve to engage the antenna and restrain the flag 14 against rotational movement.

For the purpose of securing the flag 14 to the antenna 12, there are provided resilient tubing sections or rings 24 one of which is received over each of the mounting projections 18b and 18c. In a constructed embodiment, the rings 24 were made from ethylene propylene diene monomer with a hardness of 45 to 50 durometer and having an inside diameter of 0.234 inches, an outer diameter of 0.395 inches and a length of 11/16 inches. Alternatively, the rings could take the form of o-rings which could apply the necessary resilient force between the mounting rib 18 and the antenna 12.

The material of the rings 24 provides sufficient elasticity so that the rings may be assembled first on to the antenna 12 as shown by the upper ring 24 in FIG. 2 and then slid over the mounting projections 18b and 18c encircling the antenna tubing and the mounting projections as shown by the lower ring 24 in FIG. 2. The outer ends of the mounting projections 18a and 18b are formed with sloping surfaces or ramps 26 to facilitate sliding the rings 24 over the ends of the mounting projections 18a and 18b. In order to retain the rings 24 engaged with the mounting projections 18a and 18b, there are provided laterally projecting bars 28 extending lengthwise on the mounting projections. These bars 28 serve to further tension the rings 24 restraining the rings from displacement from their assembled position on the mounting projections 18a and 18b.

As may best be seen from FIGS. 3 and 4, the channel 20 in the mounting rib 18 varies in depth from the portion adjacent to the flag body 16 where it is the deepest to the portion of the channel 20 within the mounting projections 18a and 18b where it is the shallowest. As shown in FIGS. 4 and 5, there are strengthening webs 30 disposed within the channel 20 and extending outwardly from the wall 20c and terminating short of the edges 20d. Thus, the webs 30 provide support and strengthening for the mounting rib 18 but are not in a position to engage the antenna when the flag 14 is assembled to the antenna 12. Accordingly, the sharp edges 20d of the channel walls engage the antenna throughout the length of the channel 20 to restrain the flag 14 from rotating with respect to the antenna 12.

From the foregoing description, the simplicity of the antenna mounted flag of the present invention is evident. The flag 14 including the indicia bearing body 16 and the mounting rib 18 is a one piece molded part which may be manufactured at a minimum cost. The only added parts necessary to attach securely the flag 14 to the antenna 12 are the two pieces of resilient plastic tubing forming the rings 24. In order to assemble the flag 14 to the antenna 12, the rings 24 are slid on to the antenna in encircling relationship and then spaced apart above and below the suitably positioned flag with the walls of the mounting rib engaged against the antenna 12. The rings 24 are then forced over the mounting projections 18a and 18b thereby providing a tensioning of the rings to secure the flag in assembled relationship to the antenna 12 with the wall edges 20d of the mounting rib 18 restraining the flag against rotation or vertical movement with respect to the antenna. Removal of the flag 14 from the antenna 12 may also be accomplished. simply and efficiently by sliding the rings away from the mounting projections reversing the steps used in assembling the flag 14 to the antenna 12. The flag 14 may be imprinted with any suitable or desired advertisement, message or indicia from a showing of the American flag to a notification that the vehicle flying the flag is part of a funeral procession.

It is also contemplated that several flags could be mounted on a single antenna using the simplified mounting concept of the present invention. For example, an American flag could be mounted upper most and a pennant with a patriotic slogan might be mounted immediately below the flag. Even with two flags mounted on the antenna, it is a simple matter to remove the flags in preparation for a car wash by simply sliding the resilient rings off of the mounting projections to separate the flags from the antenna leaving the rings on the antenna where they will be undisturbed by the car wash. To reassemble the flags to the antenna, the resilient rings which were left on the antenna are reapplied to the mounting projections on the flags.

While in the foregoing specification an embodiment of the invention has been set forth in detail, it is to be understood that this description is made only by way of example and not as a limitation to the scope of our invention as set forth in the accompanying claims.

We claim:

1. An antenna flag comprising
   a rigid flag body having a substantial flat planar configuration with a mounting edge along one side thereof,
   a mounting rib disposed along and coextensive with said mounting edge and including mounting projections extending beyond said mounting edge,
   said mounting rib being formed with a lengthwise extending channel defined by a pair of spaced sidewalls extending outwardly away from said flag body positioned for engagement at their outer edges with an automobile radio antenna,
   said sidewall outer edges being formed with sharp corners spaced apart less than the outer diameter of said radio antenna to engage the antenna through out the length of said channel, and
   a pair of resilient rings for encircling said mounting projections and said antenna in a tensioned condition to secure said flag against said antenna restraining rotation of said flag with respect to said antenna.

2. The antenna flag of claim 1 wherein said mounting projections are formed at the ends remote from said mounting edge with beveled ends to facilitate assembling said resilient rings over said mounting projections.

3. The antenna flag of claim 1 wherein said mounting projections are formed with laterally projecting bars which engage said rings to restrain said rings from sliding off said mounting projections.

4. The antenna flag of claim 1 wherein said resilient rings comprise sections of resilient tubing having a length substantially greater than the outside diameter of the tubing.

5. The antenna flag of claim 1 wherein said mounting projections are formed at the ends remote from said mounting edge with beveled ends to facilitate assembling said resilient rings over said mounting projections, said mounting projections being formed with laterally projecting bars which engage said rings to restrain said rings from sliding off said mounting projections.

6. The antenna flag of claim 1 wherein said flag is a one piece molded part with said flag body being tapered in thickness from adjacent said mounting edge to the edge remote from said mounting edge.

7. The antenna flag of claim 6 wherein said flag body is at least twice as thick adjacent said mounting edge as at said edge remote from said mounting edge.

8. An antenna flag comprising
   a rigid flag body having a substantial flat planar configuration with a mounting edge along one side thereof and a trailing edge remote from said mounting edge,
   a mounting rib disposed along and coextensive with said mounting edge and including mounting projections extending beyond said mounting edge,
   said mounting edge being formed with a lengthwise extending channel defined by a pair of spaced sidewalls extending outwardly away from said flag body positioned for engagement at their outer edges with an automobile radio antenna,
   said sidewall outer edges being spaced apart less than the outer diameter of said radio antenna to engage the antenna through out the length of said channel, and
   a pair of resilient means one of which encircles each of said mounting projections and said antenna functioning to force said mounting rib against said antenna, said resilient means being of a resilience and size to function in securing said flag to said antenna over a range of antenna tubing diameters from ⅛ inch diameter to ¼ inch.

9. The antenna flag of claim 8 wherein said flag body tapers from said mounting edge to said trailing edge, said flag body being at least twice as thick at said mounting edge as at said trailing edge.

10. In a flag for mounting on a vertical vehicle radio antenna of the type having a tubular member of an outside diameter between ⅛ and ¼ inches, the combination comprising,
    a flag body of molded plastic material having a thin planar configuration with a leading edge and a trailing edge, the body being uniformly tapered from the leading edge which is thicker to the trailing edge which is thinner,
    a mounting rib molded integrally with said body along said leading edge and including mounting projections extending beyond said leading edge at opposite ends of said mounting rib, said rib having a channel formed by spaced walls and opening away from said flag body, said walls being spaced apart a distance less than ⅛ inch,
    a pair of resilient means one of which encircles each of said mounting projections and said tubular antenna member functioning to force said mounting rib against said antenna member, said resilient means being of a resilience and size to function in securing said flag to said antenna over a range of antenna diameters from ⅛ inch diameter to ¼ inch.

11. The combination of claim 10 wherein said mounting projections are formed at the ends remote from said mounting edge with beveled ends to facilitate assembling said resilient means over said mounting projections.

12. The antenna flag of claim 10 wherein said mounting projections are formed with laterally projecting bars which engage said resilient mean to restrain said resilient means from sliding off said mounting projections.

13. The combination of claim 10 wherein said resilient means comprise sections of resilient tubing having a length substantially greater than the outside diameter of the tubing.

14. The combination of claim 13 wherein said mounting projections are formed at the ends remote from said mounting edge with beveled ends to facilitate assembling said resilient tubing over said mounting projections, said mounting projections being formed with laterally projecting bars which engage said resilient tubing to restrain said resilient tubing from sliding off said mounting projections.

* * * * *